3,284,522
CYCLOHEXANE PRODUCTION
Alexander K. Logwinuk, Broomall, and Josef W. Schall, Newtown Square, Pa., assignors to Air Products and Chemicals, Inc., Philadelphia, Pa., a corporation of Delaware
Filed Apr. 20, 1964, Ser. No. 360,919
10 Claims. (Cl. 260—667)

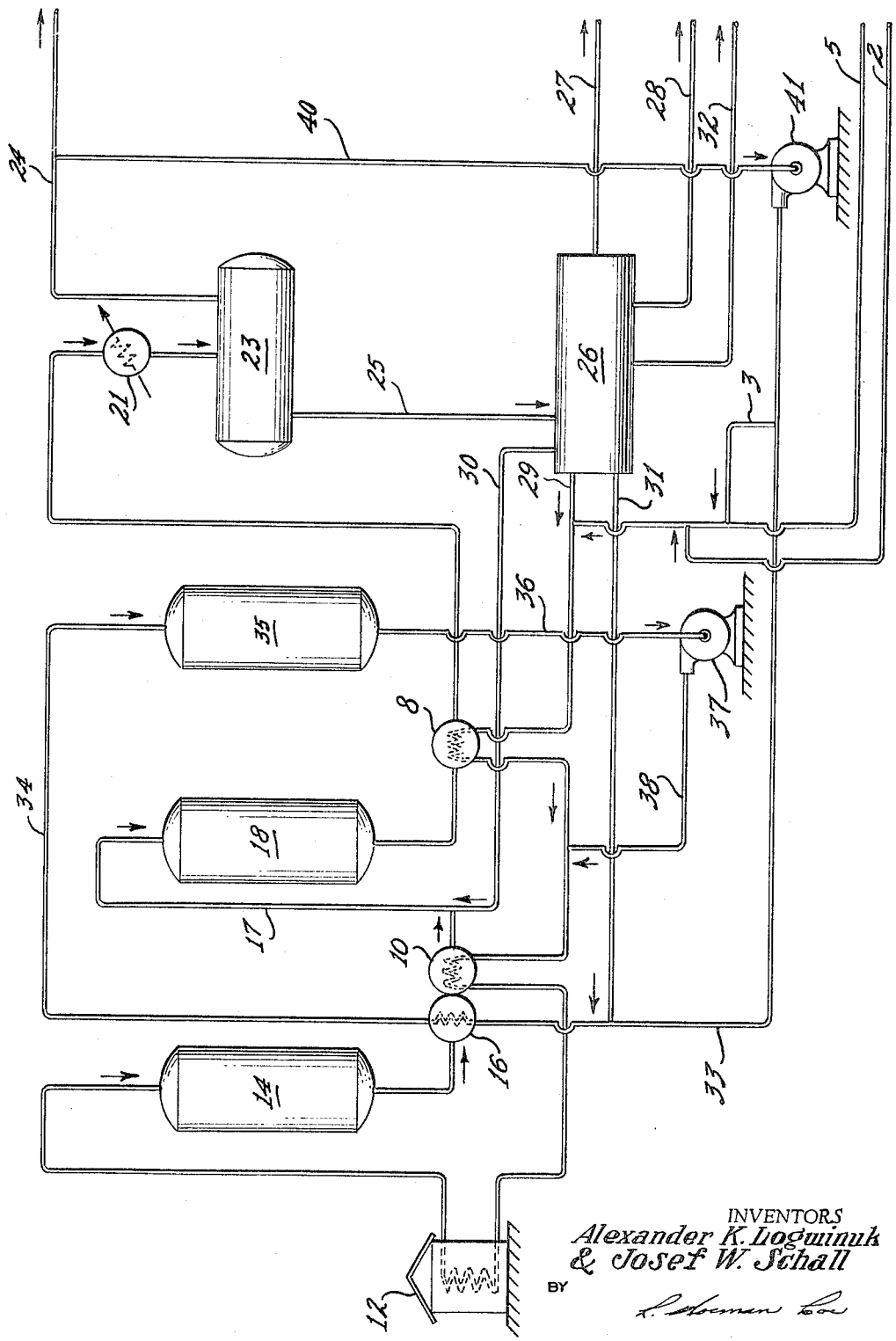

The present invention relates to the conversion of alkylated benzene such as toluene and/or xylene to cyclohexane of high purity by a simplified and unique three-reactor system.

Cyclohexane has been derived by the catalytic hydrogenation of benzene. In commercial operations, however, it is desirable to effect complete conversion of an aromatic hydrocarbon such as benzene to the corresponding cycloparaffin. This is difficult to accomplish in certain processes since the exothermic reaction temperature must be satisfactorily controlled. Otherwise, undesirable secondary reactions occur and the desired cycloparaffin may contain as high as 10% by weight of residual unconverted aromatic hydrocarbon.

For industrial purposes and especially in the production of nylon, the purity of cyclohexane is of considerable importance. Expensive purification operations, careful regulation of the purity and composition with respect to the reactants and elaborate and complicated reactor designs for controlling the exothermic reaction conditions have all been suggested as methods for obtaining cyclohexane of the requisite purity. These schemes, while having varying degrees of effectiveness, for obtaining cyclohexane of the desired product purity have prevented the overall operations from having the economic advantages theoretically possible.

The process of the present invention is directed to a method for the conversion of alkylated benzenes such as toluene, xylene and ethyl, propyl or butyl substituted benzene as well as mixtures of these alkylated benzenes to 99+% purity cyclohexane and brings about a simplification in operation with attendant economic advantages. Unlike many conventional systems, high purity feed material is not required. The process described herein includes five stages, viz., (1) demethylation, (2) hydrogenation, (3) reforming, (4) recycle, and (5) product recovery.

In one embodiment of the invention, toluene together with hydrogen are passed over a specific chrome-alumina catalyst in at least one reactor at 500 to 1200 p.s.i.g. and 1050 to 1250° F. The effluent from this reactor is then cooled to a temperature of 250 to 650° F. and contacted at substantially the same pressure with a hydrogenation catalyst in one or more second reactors. The effluent from the second reactor system is then condensed and separated into hydrocarbon fractions by suitable distillation equipment. The fraction boiling within ±5° of 101° C. is sent to a third reactor and passed over a dehydrogenation catalyst at 200 to 500 p.s.i.g. and 700 to 1000° F. After first being compressed to the desired pressure, the effluent from the third reactor is then recycled to the first reactor. The desired product, cyclohexane, is recovered from the distillation equipment as a fraction of at least 99% purity.

The chrome-alumina catalyst in the first reactor is characterized in composition as containing 10 to 25% by weight chromium expressed as $Cr_2O_3$, 0.8 to 1.5% by weight sodium expressed as $Na_2O$ and the balance consisting of an alumina support derived from alumina beta trihydrate. In the preparation of the support, for this catalyst, dehydrated alumina is subjected to an atmosphere comprising steam at a temperature in the range of 850 to 1000° F. for a time period in the range of 1 to 3 hours to adjust the surface area of the dehydrated support to the range of 150 to 200 square meters per gram prior to the incorporation of the chromia compound therein. Before using the catalyst, it is calcined in an atmosphere comprising steam at conditions including a temperature in the range of 1375 to 1425° F. and for a time in the range of 3 to 6 hours.

The catalysts which have been found suitable for use in the second reactor are the hydrogenation catalysts well known in the art and especially platinum, palladium or nickel as well as combinations of these metals (or the oxides thereof) contained on or within a supporting material which is usually of a high surface area such as clays, alumina, bauxite, zirconia, etc. A particularly desirable hydrogenation catalyst contains 0.1 to 40% and preferably 0.1 to 20% by weight of nickel associated with macroporous silica support, i.e., a support having controlled porosity wherein at least 10% of the pore volume is provided by pores having a diameter of at least 0.04 micron. In order to avoid isomerization of the cyclohexane formed in the second reactor to methylcyclopentane, it is preferable that this catalyst be non-acidic in nature.

Conventional dehydrogenation catalysts may be employed in the third reactor. However, the preferred catalyst for the reactor comprises 0.2 to 2 weight percent platinum impregnated on an alumina base and is prepared in known manner. This catalyst advantageously may contain a minor amount (0.1 to 6%) of combined halogen.

The drawing represents diagrammatically the process flow arrangement for carrying out the method of this invention. In the schematic illustration, make-up hydrogen from line 2 and recycle hydrogen from line 3 together with toluene present in line 5 are mixed together and passed through heat exchangers 8 and 10 respectively. The temperature of the mixture is then elevated in heater 12 before the toluene-hydrogen admixture enters the first reactor 14. In reactor 14, the toluene-hydrogen mixture is reacted over the aforementioned chrome-alumina catalyst at 500 to 1200 p.s.i.g. and preferably 700 to 1000 p.s.i.g. at a temperature between 1050 to 1250° F. for a residence time of 30 to 150 seconds and more desirably 50 to 100 seconds.

Upon leaving reactor 14, the effluent, having a $H_2$/aromatic mol ratio desirably in the range of 4:1 to 6:1, is cooled by heat exchangers 16 and 10 to a temperature in the range of 250 to 650° F. and preferably about 350 to 550° F. before being passed to the second reactor 18. $H_2S$ formed in reactor 14 may be removed from line 17 by suitable means (not shown) if the catalyst in reactor 18 is sensitive to $H_2S$. In reactor 18, the effluent from the first reactor is contacted with a hydrogenation catalyst of the type hereinabove described, at a pressure essentially equal to that of the first reactor. The liquid hourly space velocity (LHSV) in the second reactor may vary from 0.5 to 5 but is preferably between 1 and 2.

The effluent from reactor 18 contains cyclohexane, methylcyclohexane and in some instances minor amounts of unreacted toluene together with excess hydrogen. This effluent is cooled in heat exchangers 8 and 21 and then flashed into a high pressure flash drum 23. Light gases and hydrogen are vented by means of line 24 while the condensed hydrocarbons are sent via line 25 to distillation equipment 26. In the distillation operation, dissolved gases are removed (line 27) and methylcyclohexane, cylohexane, diphenyl, cyclohexene (if any), benzene (if any) and toluene (if any) are separated. Diphenyl is recovered from line 28. Preferably, this recovered diphenyl is recycled to extinction by combining it with hydrogen from line 33 and/or line 2, passing the diphenyl-hydrogen admixture through a thermal coil (not shown) preferably located in heater 12, raising the temperature in excess of 1300° F. and then passing the mixture into reactor 14.

Any toluene present in the distillation equipment 26 is added by means of line 29 to the toluene supplied through line 5 to reactor 14 and thus recycled to extinction. Benzene and cyclohexene are recycled through line 30 to line 17. Cyclohexane is recovered from line 32. Methylcyclohexane, on the other hand, is removed from distillation equipment 26 and sent to a third reactor 35 in which the methylcyclohexane, an undesirable side reaction product in many conventional processes for the production of cyclohexane, is converted to toluene and hydrogen for recycle back into the system. Thus, methylcyclohexane from line 31 is combined with recycle hydrogen from line 33 and passed through line 34 to reactor 35. Preferably the hydrogen concentration of the inlet of reactor 35 is such as to provide a $H_2$ to aromatics ratio of between about 1 to about 16 mols/mol. In reactor 35 the methylcyclohexane and hydrogen mixture is passed at a LHSV of between 7 to 20 and preferably 9 to 12 over a platinum-on-alumina catalyst at 200 to 500 p.s.i.g. and a temperature in the range of 700 to 1000° F. and preferably 200 to 400 p.s.i.g. and 750 to 950° F. Toluene and hydrogen recovered from reactor 35, are passed through line 36, compressor 37 and line 38 for recycle to reactor 14. The material in line 36 can be cooled, if desired (by means not shown), before being passed to compressor 37.

Hydrogen is preferably separated from gas stream 24 and returned through line 40 and compressor 41 to line 33 for use in the system. The presence of a hydrogen-purification unit (not shown) in line 24 is dependent upon quantity and purity of available make-up hydrogen. Make-up hydrogen from line 2 is added to the system as required to satisfy stoichiometric and vent requirements. Regardless of the source, the mixed hydrogen stream employed in the system should be of at least 50 mol percent purity.

The following yields are obtained operating under the above conditions employing toluene as the charge stock hydrogen in an amount 40% in excess of the stoichiometric quantity, chrome-alumina catalyst containing about 20% $Cr_2O_3$ in the first reactor, 9.7 wt. percent nickel on macroporous silica as the catalyst in the second reactor and 0.6 weight percent platinum impregnated on an alumina base as the catalyst in the third reactor.

| Charge to reactor 14: | Mols |
|---|---|
| Make-up hydrogen (line 2) | 4027.7 |
| Hydrogen (line 38) | 1928.7 |
| Hydrogen (line 3) | 1257.8 |
| Toluene (line 5) | 1000.0 |
| Toluene (line 38) | 428.6 |

| Charge to reactor 18: | |
|---|---|
| Hydrogen | 6096.5 |
| Methane | 1043.1 |
| Ethane | 21.5 |
| Propane | 6.5 |
| Benzene | 970.0 |
| Toluene | 428.6 |
| Diphenyl | 6.2 |

| Charge to flash drum 23: | |
|---|---|
| Hydrogen | 2115.0 |
| Methane | 1043.1 |
| Ethane | 21.5 |
| Propane | 6.5 |
| Cyclohexane | 970.0 |
| Methylcyclohexane | 428.6 |
| Diphenyl | 6.2 |

| Charge to reactor 35: | |
|---|---|
| Hydrogen | 857.2 |
| Methylcyclohexane | 428.6 |

| Product recovery from 26: | |
|---|---|
| Cyclohexane | 970.0 |

The fact that hydrogen recovery from line 24 may be less than 100% does not alter the yields set forth since, as previously indicated, loss of hydrogen merely effects the amount of make-up hydrogen added to the system.

It is, of course, obvious that the particular location of heat exchangers, heaters and compressors is not critical to the invention provided that the reactants are maintained at the conditions specified for each of the aforementioned reactors. Moreover, the nature of the cooling media is not critical and may comprise water or any other convenient and economical coolant such as gaseous or liquid reactants and/or reactor effluents.

While the first and second reactors (14 and 18 respectively) are shown in the schematic illustration as single reactor vessels, it is to be understood that one or more reactor vessels are contemplated. The use of two reactor vessels in series with inter-reactor cooling of the effluent is a particularly effective design for obtaining the desired control of the process, high conversion and complete hydrogenation.

Obviously, many modifications and variations of the invention as hereinbefore set forth may be made without departing from the spirit and scope thereof and therefore only such limitations should be imposed as are indicated in the appended claims.

What is claimed is:

1. The method for the conversion of alkylated benzenes to cyclohexane which comprises:
    (a) contacting an alkylated benzene-hydrogen admixture with chrome-alumina catalyst in at least one first reactor at 700 to 1000 p.s.i.g. and 1050 to 1250° F.;
    (b) cooling the effluent from the first reactor to a temperature of 250 to 650° F.;
    (c) contacting the cooled effluent from the first reactor with a hydrogenation catalyst in at least one second reactor at a pressure substantially equivalent to that of the first reactor thereby forming cyclohexane and methyl cyclohexane;
    (d) separating methylcyclohexane from the second reactor effluent;
    (e) contacting the methylcyclohexane with a dehydrogenation catalyst in a third reactor at 200 to 500 p.s.i.g. and 700 to 1000° F.
    (f) recycling the reactor effluent obtained in the third reactor to the first reactor; and
    (g) recovering cyclohexane from the second reactor effluent.

2. The method of claim 1 wherein the residence time of the alkylated benzene-hydrogen admixture in the first reactor is between 30 to 150 seconds.

3. The method of claim 1 wherein the chrome-alumina catalyst comprises 10 to 25% by weight chromium expressed as $Cr_2O_3$, 0.8 to 1.5% by weight sodium expressed as $Na_2O$ and the remainder an alumina support.

4. The method of claim 1 wherein the hydrogenation catalyst comprises 0.1 to 40% by weight nickel supported on macroporous silica.

5. The method of claim 1 wherein the dehydrogenation catalyst comprises 0.2 to 2 weight percent platinum impregnated on an alumina carrier.

6. The method for the conversion of $C_1$ to $C_4$ alkylated benzenes to cyclohexane which comprises:
    (a) contacting an alkylated benzene-hydrogen admixture with chrome-alumina catalyst in at least one first reactor at 700 to 1000 p.s.i.g. and 1050 to 1250° F.;
    (b) contacting cooled effluent from the first reactor with a hydrogenation catalyst in at least one second reactor at a pressure substantially equivalent to that of the first reactor thereby forming cyclohexane, methyl cyclohexane and diphenyl;
(c) separating methylcyclohexane from the second reactor effluent;
(d) combining the methylcyclohexane with hydrogen;
(e) contacting the methylcyclohexane-hydrogen mixture with a dehydrogenation catalyst in a third reactor at 200 to 500 p.s.i.g. and 700 to 1000° F.;
(f) recycling the reactor effluent obtained in the third reactor to the first reactor; and
(g) recovering cyclohexane from the second reactor effluent.

7. The method of claim 6 wherein the alkylated benzene is toluene.

8. The method of claim 6 wherein the alkylated benzene is xylene.

9. The method of claim 6 wherein the alkylated benzene is an admixture of toluene and xylene.

10. The method of claim 6 wherein diphenyl is recovered from the second reactor effluent, combined with hydrogen, heated to a temperature above 1300° F. and recycled to the first reactor.

References Cited by the Examiner
UNITED STATES PATENTS

| | | | |
|---|---|---|---|
| 2,898,387 | 8/1959 | Teter | 260—667 |
| 2,934,573 | 4/1960 | Paulsen et al. | 260—667 |
| 2,951,886 | 9/1960 | Paulsen | 260—672 |
| 3,178,486 | 4/1965 | Maerker et al. | 260—672 |
| 3,213,150 | 10/1965 | Cabbage | 260—667 |
| 3,213,151 | 10/1965 | Sherk | 260—667 |

DELBERT E. GANTZ, *Primary Examiner.*

S. P. JONES, *Assistant Examiner.*